May 20, 1969 G. NIEUWEBOER 3,444,731

TENSION RESOLVER

Filed Jan. 31, 1967

INVENTOR
GERRIT NIEUWEBOER

BY Howard P. West Jr.

ATTORNEY

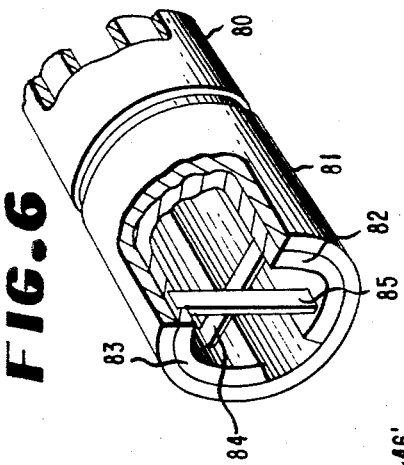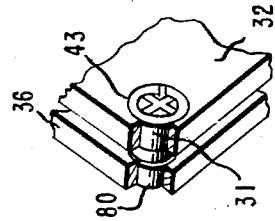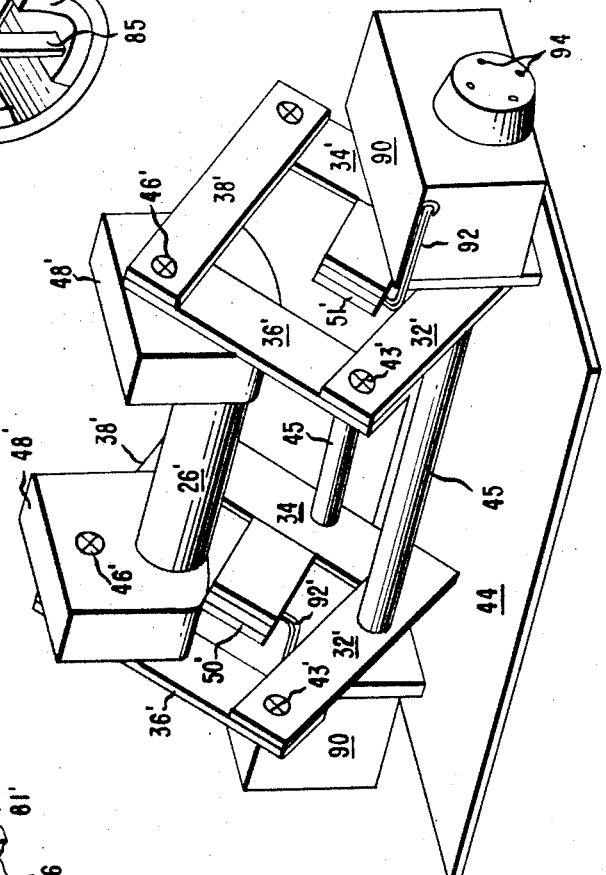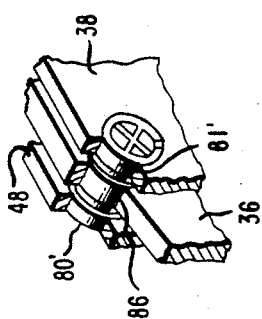

United States Patent Office 3,444,731
Patented May 20, 1969

3,444,731
TENSION RESOLVER
Gerrit Nieuweboer, Claymont, Del., assignor to E. I. du Pont de Nemours and Company, Wilmington, Del., a corporation of Delaware
Filed Jan. 31, 1967, Ser. No. 612,921
Int. Cl. G01l 5/12
U.S. Cl. 73—144    8 Claims

ABSTRACT OF THE DISCLOSURE

A device for simultaneously measuring the tension in a moving threadline before and after it passes over a direction changing pin. The pin is supported by a resilient closed linkage which resolves the tension induced force on the pin into two components which are transduced to corresponding electrical outputs by transducers attached to adjacent links of the linkage. A meter arrangement actuated by the electrical outputs indicates the tension.

Background of the invention

This invention relates generally to the production of yarn and, more particularly, to the measurement of tension in moving yarns, threads, filaments, or the like.

It is well known that synthetic yarns, when stretched or drawn, undergo orientation and become highly tenacious. Control of the orientation step is an especially critical factor in achieving uniformity of product, since small variations in tension and other process conditions lead to significant variations in the dyeability of the yarn and other uniformity parameters. For example, when drawing yarn in a draw bath around a pair of direction-changing stripper pins, as disclosed in U.S. Patent 3,091,805 to Dusenbury, it is particularly advantageous to simultaneously monitor the threadline tension before and after it passes over the first stripper pin to insure uniform drawing action. Normally, this is accomplished by two hand-held or permanently fixed tensiometers, one measuring threadline tension before and one after the pin. This is undesirable because it requires two additional yarn contact points that may degrade the yarn under measurement.

Summary of the invention

It is accordingly an object of this invention to provide a novel apparatus set-up whereby the threadline tension before and after the threadline passed over a direction-changing pin can simultaneously be measured without interposing additional contact points along the course of travel of the yarn.

This objective is accomplished, in a yarn drawing apparatus wherein the yarn is passed at an angle over a pin and exerts a force on the pin, by a tension resolver supporting the pin that measures the tension of the strand material before and after the pin. The resolver comprises a base and a closed resilient linkage, with each link pivotally connected at its ends to different links, the links, in turn, being pivotally connected to the base at one of its linkage pivots. The pin is attached to the linkage at the pivot point diametrically opposite the base pivot. Constraining means are provided at each pivot point to support the linkage against threadline tension. Displacement transducers are attached to the links adjacent the base pivot for converting the tension related movement of the linkage to corresponding electrical outputs, and tension indicating meters connected to each transducer are actuated by the electrical outputs.

Brief description of the drawings

FIG. 6 is an enlarged partially sectioned view of a flexural pivot.
FIG. 7 is a partial perspective view showing the pivotal attachment of two bars of the four-bar linkage.
FIG. 8 is a partial perspective view showing the pivotal mounting of the pin holder to the linkage.
FIG. 9 is a perspective view of the preferred embodiment of the invention.

Description of the illustrated embodiments

Figure 1:
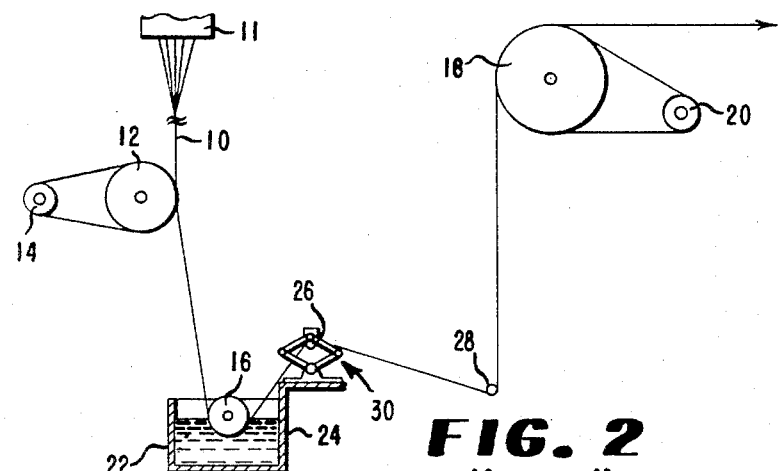
FIGURE 1 is a diagrammatic view of the drawing process incorporating the invention.

Referring now to FIG. 1, undrawn yarn 10 is supplied to feed roll 12 from a spinning supply source 11. Several wraps are usually taken around the feed roll together with its associated separator roll 14. The yarn is then passed under draw pin 16, onto draw roll 18 and its separator roll 20 and is wound up on a suitable package (not shown). A tank 22 is provided containing a bath of liquid 24 in contact with draw pin 16. Between the draw pin and the draw roll the yarn is passed around stripper pins 26 and 28 which are so disposed with respect to the draw pin and draw roll that the yarn is caused to undergo a sharp change in direction. A tension resolver 30 attached to one side of tank 22 supports stripper pin 26.

Figure 2:
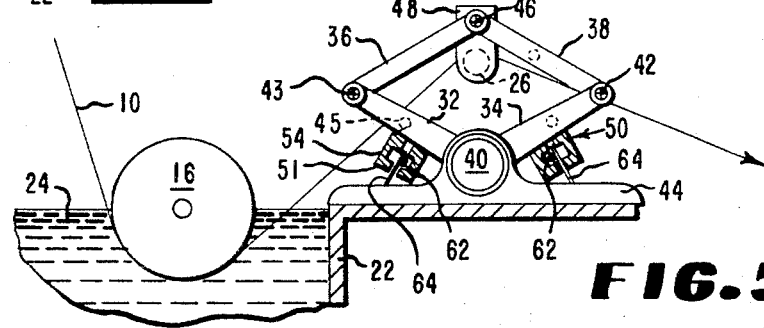
FIG. 2 is an enlarged partial side view of FIG. 1.

As shown in FIG. 2, the tension resolver 30 consists of a closed four-bar parallelogram-shaped linkage attached to base 44 which is, in turn, attached to the tank 22. Bars 32 and 34 are pivotally attached at one end to each other and to base 44 by means of flexural pivot 40. Bars 36 and 38 are pivotally attached to each other at one end and to holder 48 by flexural pivot 46. Holder 48 supports pin 26. Bars 36 and 38 are pivotally attached at their opposite ends to bars 32 and 34 respectively, by flexural pivots 43 and 42. Hall effect transducers 50 and 51 are fastened between bars 34 and 32 and base 44 to transduce the movement of the bars to an electrical output, as will be described hereinafter.

Figure 5:
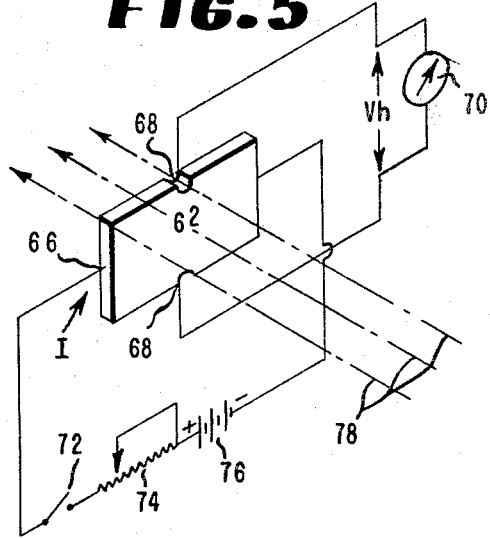
FIG. 5 is a circuit diagram for the transducers.

Extending upwardly from base 44 are two members 64 to which are bonded two Hall devices 62 of indium arsenic or other suitable semiconductor material. As shown in FIG. 5, a Hall device 62 has end electrodes 66 through which a current is supplied from battery 76. Another pair of electrodes 68 are located in the opposite lateral faces of Hall device 62 and serve as contacts through which the semiconductor is connected to a meter 70. An off-on switch 72 and a variable resistor 74 are provided in the circuit of battery 76.

When the current I flows in a Hall effect device and a magnetic field 78 is applied at right angles to the current flow, an electrical potential $V_h$ is generated which is perpendicular to both the direction of current flow and the magnetic field. This potential appears at points which would be at equal electrical potential but for the magnetic field, for example, at the mid-points of the lateral faces of wafer 62 where electrodes 68 are attached. The Hall potential may be measured with a DC voltmeter 70 or by any other instrument that will respond to changes in potential. This potential is proportional to both the electric current and the magnetic field. Therefore, if the electric current is kept constant and the magnetic field is varied, the Hall potential will vary in accordance with the strength of the magnetic field.

Figure 4:
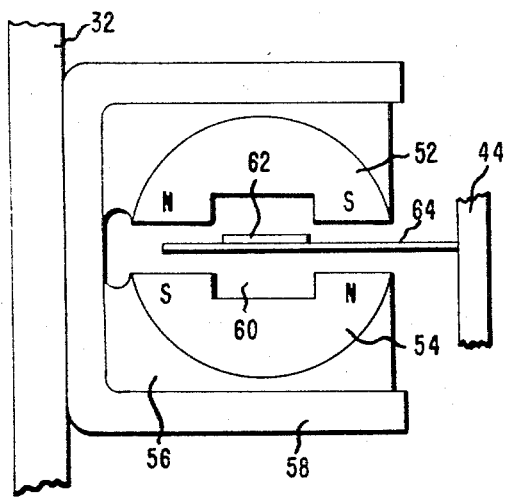
FIG. 4 is an enlarged elevation of the transducer shown in FIG. 2.

As best shown in FIG. 4, the Hall device is provided with a magnetic field by means of a pair of opposed permanent magnets 52, 54 which are conveniently held within a U-shaped holder 58 by an epoxy resin 56. Holder 58 is secured to bar 32. Each of the magnets is generally C-shaped, and are placed so that faces of opposite polarity confront each other, presenting two sets of paired poles, as shown by the N, S symbols.

By having the Hall effect device 62 located symmetrically as shown in gap 60, any small increment of motion of arm 32 in either direction will change the strength of the magnetic field cutting Hall device 62.

Flexural pivots 42, 43 are of the type disclosed by Troeger in U.S. Patent 3,142,888. Referring to FIG. 6 herein, pivot 43 has a pair of outer sleeves 80, 81, each of which is bonded to one of the inner segments 82, 83. Adjacent each end of the pivot, segments 82, 83 are interconnected by cross torsion spring members 84, 85. As shown in FIG. 7, pivot 43 has one of its sleeves 80, 81 fastened in bar 32 and the other fastened in bar 36. A double end support type of pivot, shown in FIGS. 6 and 7 of Troeger is employed at pivots 40 and 46. Referring to FIG. 8 herein, bar 36 is provided with an aperture which frictionally receives a middle sleeve 86 whereas outer sleeves 80', 81' are fastened in bar 38 and holder 48 respectively.

The proper selection of the flexural pivot is important to the satisfactory operation of this invention, as for example, when working in the range of tensions of from 20 to 600 grams, pivot 40 should have a torsional spring rating of from 25 to 50 times that of pivots 42, 43 and 46 which are equally rated.

Figure 3:
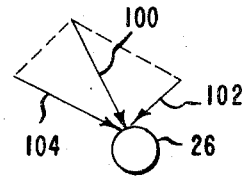
FIG. 3 is a vector diagram of the forces exerted on the pin supported by the tension resolver.

In operation, a force 100 (FIG. 3) of a given direction applied to pin 26, but not parallel to either bar 36 or 38, can be resolved into two component forces 104, 102. The force 102 applied to pin 26 parallel to bar 36 will rotate bar 38 about its pivot 42 while bar 36 will translate the coaxial force 102 and rotate bar 32 about its pivot 40. The movement of bar 32 and, consequently, of magnets 52, 54 will create a change in the output of Hall effect transducer 51 dependent on the tension related magnitude of displacement. The output of the transducer is indicated on meter 70. Using the same principle, the magnitude of force 104 can be sensed and measured in terms of tension. Since forces 104 and 102 are tension related, the apparatus described provides a novel means for simultaneously measuring the threadline tension before and after it passes over a pin without interposing additional contact points along the threadline.

The preferred embodiment of the invention is shown in perspective in FIG. 9 and employs a pair of closed four-bar linkages held in parallel spaced relationship by tie rods 45 and pin 26'. Electrical terminal junction boxes 90 are attached to base 44' and provide means for connecting the battery 76 and meters 70 to Hall effect transducers 50', 51'. Self-supporting leads 92 connect electrodes 66, 68 of Hall device 62 (FIG. 5) to terminals 94 of junction box 90. The Hall devices are positioned in the Hall effect transducers 50', 51' in a manner previously described and the operation of this preferred embodiment is essentially the same as described above.

While the apparatus of this invention has been shown to be primarily useful as a yarn tension measuring device, it is understood that this device can also be used for measuring the tension of wire, belts, film and fabrics. Furthermore, it can be readily adapted for use as a frictiometer for determining relative frictional characteristics or the dynamic coefficient of friction for different yarns sliding over guide pins of various materials.

What is claimed is:
1. In a yarn forwarding apparatus wherein a pin is positioned against the yarn to establish an angle in the path of the yarn and the yarn exerts a force against the pin, an apparatus for simultaneously measuring the yarn tension before and after it passes over the pin, said apparatus comprising:
 (a) a base;
 (b) a closed resilient linkage supporting said pin, said linkage having at least four rigid links each link being pivotally connected and biased at each of its ends to another link, said linkage being connected to said base through one of the linkage pivots, said one pivot being opposite said pin; and
 (c) transducing means connected to links adjacent said one pivot of said linkage for converting the tension related movements of said linkage corresponding to components of force exerted against said pin into electrical quantities.
2. The apparatus of claim 1 including means connected to said transducing means for simultaneously indicating yarn tension, before and after it passes over the pin, said means being actuated by said electrical quantities.
3. The apparatus of claim 1 wherein said transducing means are Hall effect devices.
4. In a yarn drawing apparatus that includes a feed roll, a draw roll and a direction changing pin positioned to establish an angle in the path of the yarn between the feed roll and draw roll, an apparatus for simultaneously measuring the yarn tension before and after it passes over the pin, said apparatus comprising:
 (a) a base;
 (b) a closed four-bar linkage supporting the pin, each bar being pivotally connected at each of its ends to another bar, said linkage being pivotally connected to said base through one of the linkage pivots, said pin being located diametrically from said pivotal base connection;
 (c) means attached to each pivot of the linkage for biasing said linkage against the yarn tension;
 (d) a pair of transducers attached to the bars adjacent the pivotal base connection for converting tension related movement of said adjacent bars to corresponding electrical quantities; and
 (e) means connected to said transducers for simultaneously indicating yarn tension, before and after the yarn passes over the pin, said means being actuated by said electrical quantities.
5. The apparatus of claim 4 wherein said linkage is in the form of a parallelogram.
6. The apparatus of claim 4 wherein said biasing means are flexural pivots.
7. The apparatus of claim 4 wherein the pin is supported at its ends by a pair of closed four-bar linkages.
8. The apparatus of claim 4 wherein said transducers are Hall effect devices.

References Cited

UNITED STATES PATENTS

| | | |
|---|---|---|
| 2,536,806 | 1/1961 | Hansen. |
| 3,091,805 | 6/1963 | Dusenbury. |
| 3,204,454 | 9/1965 | Friman et al. |
| 3,210,994 | 10/1965 | Saxl _____ 73—144 |

CHARLES A. RUEHL, *Primary Examiner.*